(12) United States Patent
Dinger et al.

(10) Patent No.: US 7,040,190 B2
(45) Date of Patent: May 9, 2006

(54) LAMINATED SHIFT FORK ASSEMBLY

(75) Inventors: R. Scott Dinger, Fenton, MI (US);
Robert J. Bartell, Perry, MI (US);
William D. Blades, Holly, MI (US)

(73) Assignee: A.M.S.E.A. Inc., Flint, MI (US)

( * ) Notice: Subject to any disclaimer, the term of this patent is extended or adjusted under 35 U.S.C. 154(b) by 156 days.

(21) Appl. No.: 10/319,445

(22) Filed: Dec. 13, 2002

(65) Prior Publication Data

US 2003/0136214 A1    Jul. 24, 2003

Related U.S. Application Data

(60) Provisional application No. 60/340,230, filed on Dec. 14, 2001.

(51) Int. Cl.
*B60K 20/00* (2006.01)

(52) U.S. Cl. .................................. 74/473.37; 47/473.36

(58) Field of Classification Search ............. 74/473.36, 74/476.37, 473.1, 339
See application file for complete search history.

(56) References Cited

U.S. PATENT DOCUMENTS

| | | | | |
|---|---|---|---|---|
| 5,517,876 | A | * 5/1996 | Genise et al. | ............. 74/473.24 |
| 5,531,133 | A | * 7/1996 | Takemura et al. | ....... 74/473.19 |
| 6,619,153 | B1 | * 9/2003 | Smith et al. | ............. 74/473.37 |
| 2003/0136214 | A1 | * 7/2003 | Dinger et al. | ............. 74/473.37 |

* cited by examiner

*Primary Examiner*—David Fenstermacher
(74) *Attorney, Agent, or Firm*—Harness, Dickey & Pierce P.L.C.

(57) ABSTRACT

A shift fork assembly having a shaft and a laminated fork welded to the shaft. The laminated fork includes a stamped range yoke and a backing plate that are brazed together. The range yoke includes a central lug segment that is retained in a mounting slot formed in the shaft to provide the requisite strength.

12 Claims, 16 Drawing Sheets

LAMINATED SHIFT FORK ASSEMBLY

CROSS-REFERENCE TO RELATED APPLICATIONS

This application claims the benefit of U.S. Provisional Application No. 60/340,230 filed on Dec. 14, 2001. The disclosure of the above application is incorporated herein by reference.

FIELD OF THE INVENTION

The present invention relates generally to multi-speed transmissions for use in motor vehicles. In particular, the present invention relates to a laminated shift fork assembly for use in the shift system of synchromesh-type transmissions.

BACKGROUND OF THE INVENTION

As is well known, shifting between gear ratios in manual transmissions is caused by selectively coupling one of the gearsets for driving an output shaft at a predetermined speed ratio relative to the input shaft. Most manual transmissions include a plurality of synchromesh gearsets with an input gear driven by one of the shafts and a speed gear rotatably supported on the other shaft. A shift system associated with the transmission includes a shift sleeve that is moveable for releaseably coupling the speed gear to its respective shaft, and a synchronizer unit operable for establishing speed synchronization between the speed gear and shaft prior to engagement of the shift sleeve. The shift system further includes one or more rails which support range forks that each have a U-shaped fork segment adapted for retention in a circumferential groove formed in the shift sleeve. In manual shift transmissions, a gearshaft lever is connected via mechanical linkages to control coordinated movement of the range forks for moving the shift sleeves so as to establish the selected gear ratio. In automated versions of manual transmissions, an electrically-controlled or hydraulically-controlled actuator is used to control movement of the range forks.

In most conventional transmissions, the range forks are forged products which require a significant amount of rough and finish machining. A critical design factor that has limited range forks to forged products is the strength requirement of the fork segment which must be able to withstand large and repeated loading during gear shifts. Other attempts to mold/cast range forks with load-absorbing fork inserts have met with limited success. Therefore, a need exists to develop alternative range fork concepts which overcome the shortcomings of the prior art.

SUMMARY OF THE INVENTION

The present invention is directed to a multi-piece shift fork assembly having a shaft and a laminated fork welded to the shaft.

As a related object, the shift fork assembly of the present invention includes a laminated fork comprised of a range yoke and a backing plate welded to a boss segment of the shaft, with at least one of the range yoke and the backing plate having a mounting flange segment retained in a mounting slot formed in the shaft.

As a further object, the range yoke and backing plate are stamped plates which are laminated together via a brazing process.

As another object of the present invention, the multi-piece shift fork assembly includes a shaft having a first shaft member with a cylindrical post segment and a second shaft member having a socket adapted to receive the post segment. At least one range fork is mounted on the post segment of the first shaft member and disposed between the first shaft member and the second shaft member when the post segment is inserted into the socket.

As a related object, the range fork has an aperture sized to receive the post of the first shaft member.

As a further object, the shaft includes a first shaft member having a post on each end and a pair of second shaft members each having a socket adapted to receive the posts. At least one range yoke is mounted on each post of the first shaft member and disposed between the first shaft member and the pair of second shaft members when the posts are inserted into the sockets.

As still another object of the present invention, the multi-piece shift fork assembly includes a tubular shaft having at least one range yoke mounted thereon.

As a related object, the tubular shaft includes a locator sleeve mounted on the tubular shaft and at least a pair of range yokes mounted on each end of the tubular shaft and abutting the ends of the locator sleeve.

As still another object of the present invention, the multi-piece shift fork assembly includes a solid shaft having a pair of range yokes mounted thereon.

These and other objects of the present invention will become evident to those skilled in the art following a review of the detailed description taken in view of the appended drawings.

DETAILED DESCRIPTION OF THE PREFERRED EMBODIMENTS

Figure 1:
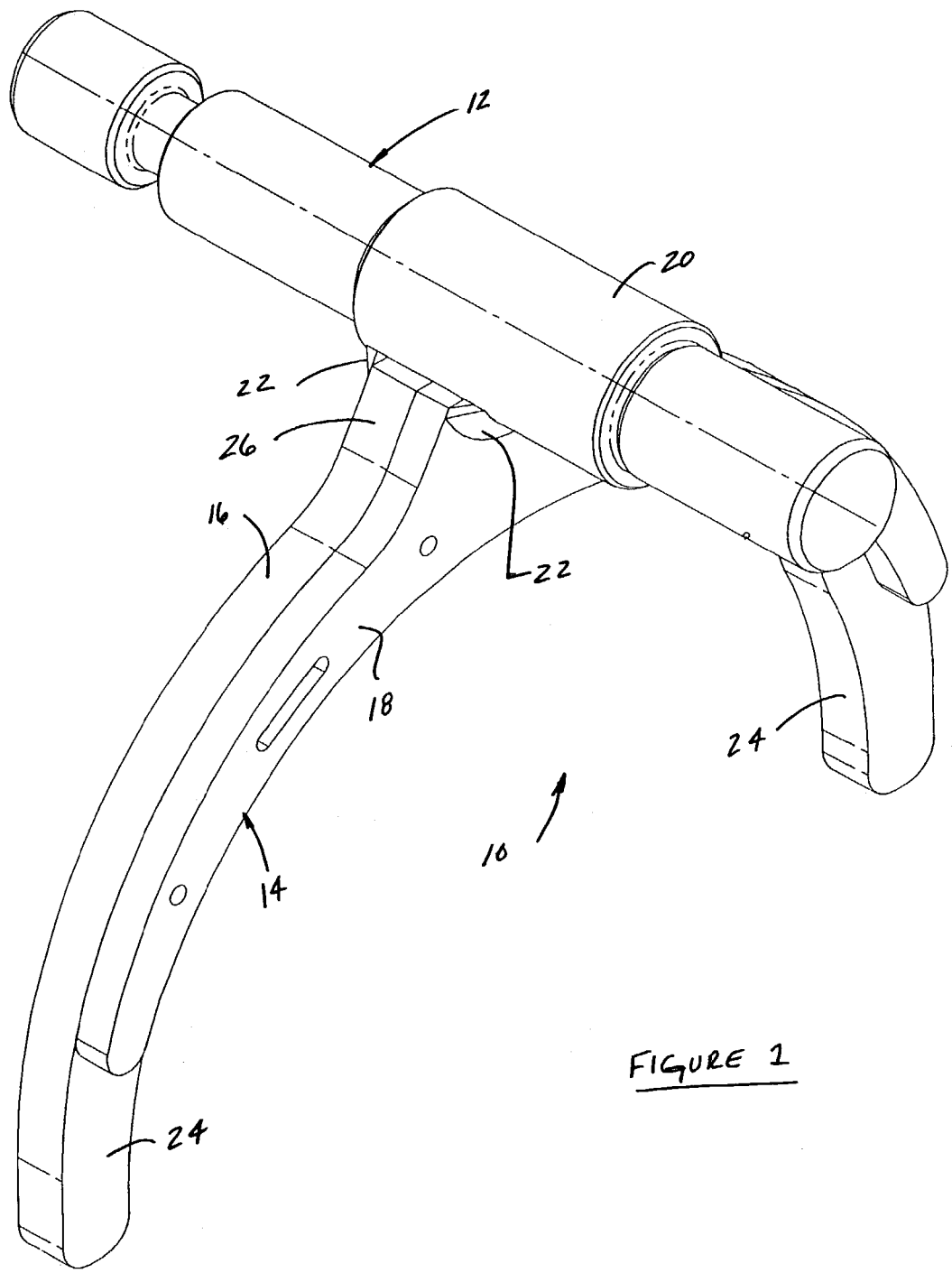
FIG. 1 is a perspective view of a laminated shift fork assembly according to a first embodiment of the present invention.
Figure 2:
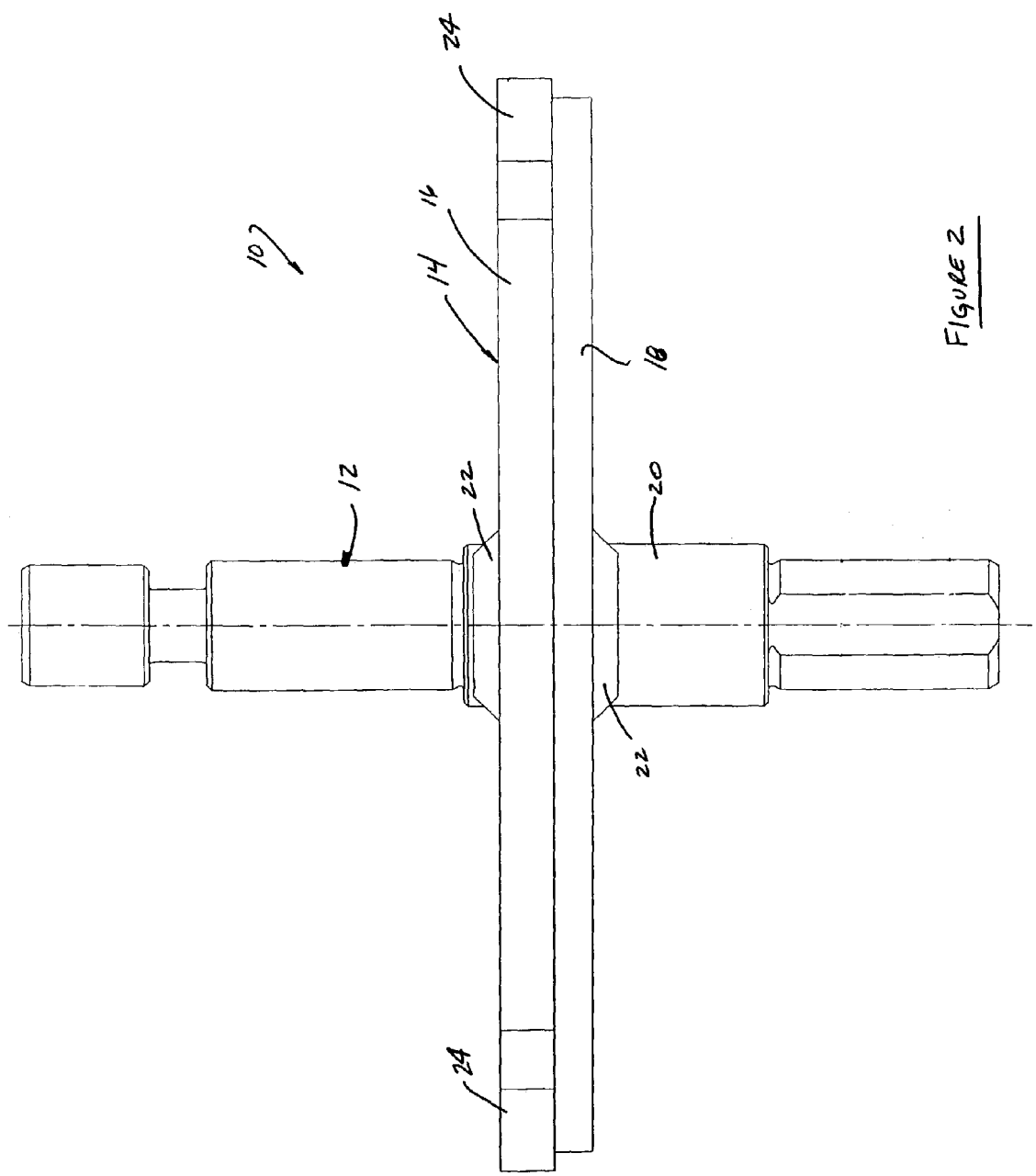
FIG. 2 is a top view of the laminated shift fork assembly shown in FIG. 1.
Figure 3:
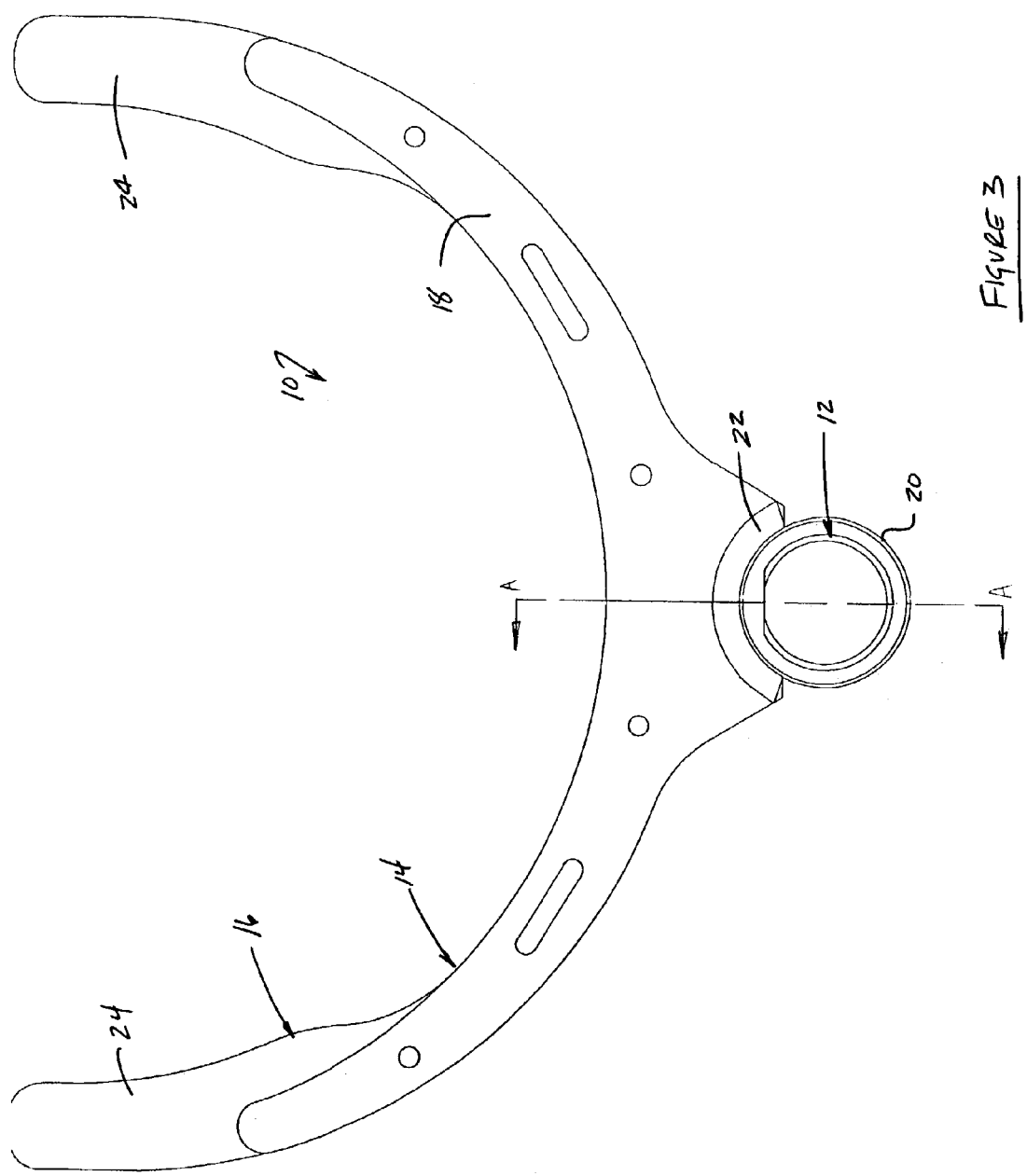
FIG. 3 is an end view of the laminated shift fork assembly.
Figure 4:
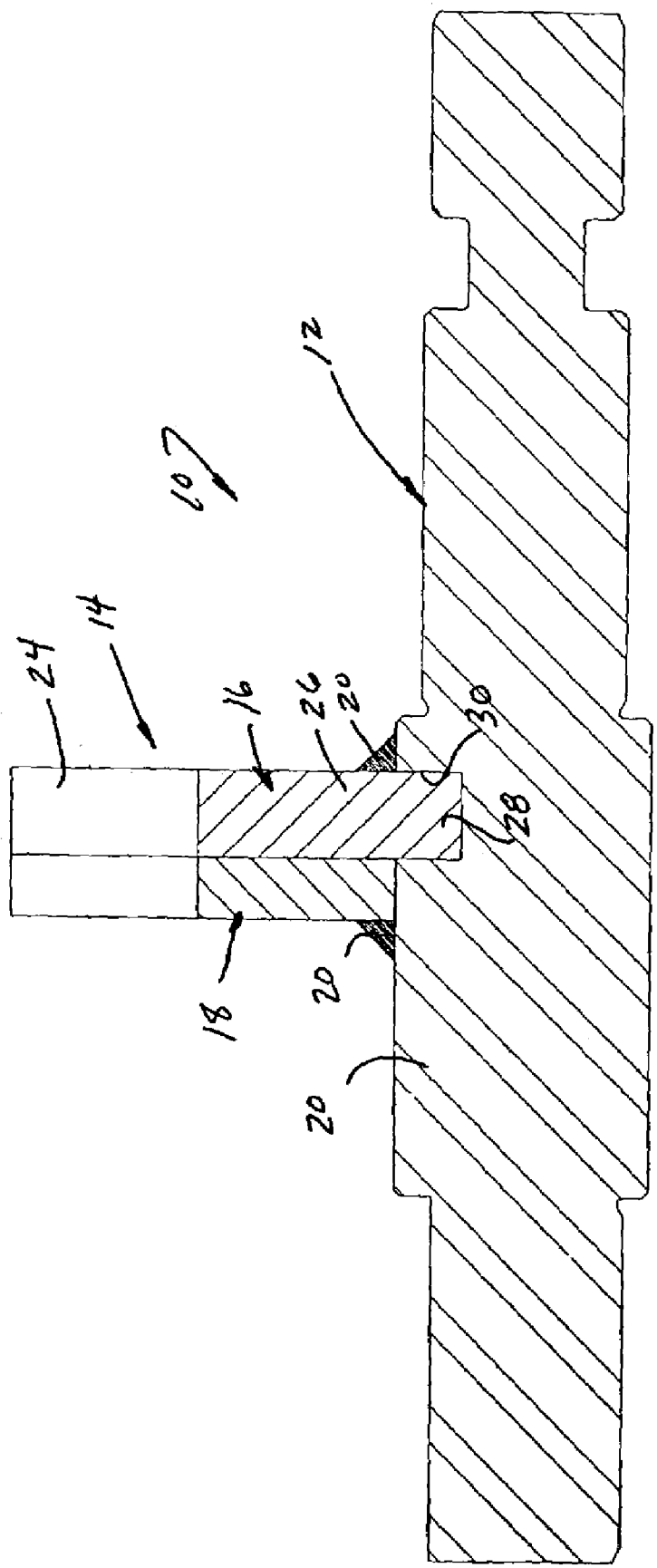
FIG. 4 is a sectional view taken along line A—A of FIG. 3.

Referring to FIGS. 1 through 4 of the drawings, a first embodiment of a shift fork assembly 10 will now be described. Shift fork assembly 10 is shown to generally include a shaft 12 and a laminated fork 14 welded to shaft 12. Laminated fork 14 includes a generally U-shaped range yoke 16 and a backing plate 18 secured to a raised cylindrical boss segment 20 of shaft 12 via beads 22 of a continuous weld material. In particular, range yoke 16 is shown to include a pair of arcuate fork tangs 24 which extend from a central lug segment 26. As best seen from FIG. 4, lug segment 26 includes a mounting flange 28 which is retained in a slot 30 formed in boss segment 20 of shaft 12. Tangs 24 are adapted for retention in the locator groove of a shift sleeve of the typed used in power transfer devices (i.e., transmissions, transfer cases, locking differentials, power take-offs, etc.) to releaseably couple a gear or sprocket to a shaft for establishing a drive connection therebetween. Typically, shaft 12 is adapted for connection to a shift rail associated with a shift system which functions to control axial movement of shift fork assembly 10.

In a preferred form, shaft 12 is made from a 1045 or 1050 material that is induction hardened to a surface hardness of 57 HRC minimum with an effective hardness depth of 0.020–0.100 to 45 HRC. Also, range yoke 16 and backing plate 18 are preferably stamped or fine blanked from a 8620 material which are copper brazed to define laminated fork 14.

Figure 5:
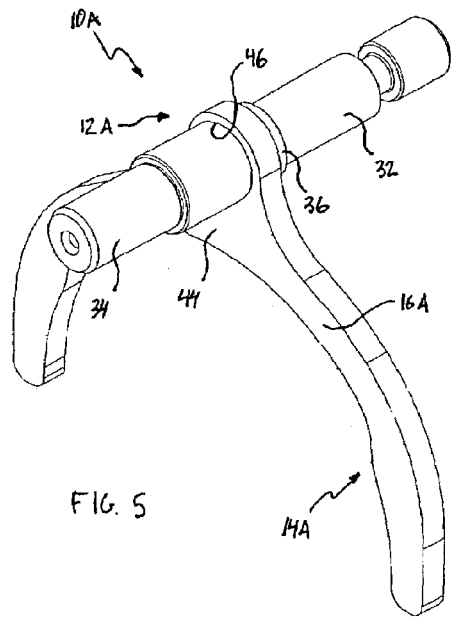
FIG. 5 is a perspective view of a laminated shift fork assembly according to a second embodiment of the present invention.
Figure 6:
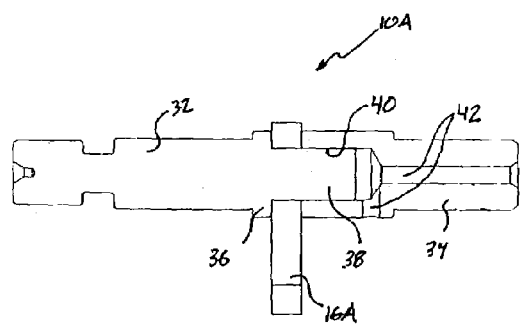
FIG. 6 is a sectional view of the laminated shift fork assembly shown in FIG. 5.

Referring now to FIGS. 5 and 6, a second embodiment of a shift fork assembly is designated by reference numeral 10A. Similarly, each additional embodiment of the shift fork assembly, discussed below, will be identified by the reference numeral 10 followed by a sequential letter suffix to indicate each different embodiment.

Shift fork assembly 10A generally includes a shaft assembly 12A and a laminated fork 14A mounted on shaft assembly 12A. Shaft assembly 12A is a two-component arrangement having a first shaft member 32 and a second shaft member 34. First shaft member 32 includes a cylindrical body segment 35 having a radial flange 36, and a cylindrical post segment 38 extending outwardly from body segment 35. As seen, post segment 38 is coaxially aligned with body segment 35. Second shaft member 34 includes an aperture 40 that defines a socket adapted to receive post 38 of first shaft member 32 therein. Second shaft member 34 further includes radial and axial channels 42 that communicate with aperture 40. Channels 42 are provided to permit introduction of a brazing or welding material to secure post 38 within aperture 40. Thus, shaft assembly 12A defines a socket-type assembly which permits simplified assembly of range fork 14A with shaft assembly 12A.

Fork 14A includes a generally U-shaped range yoke 16A having a pair of arcuate fork tangs 24A which extend from a partially cylindrical lug segment 44. Tangs 24A are adapted to be located within a groove associated with a shift sleeve to permit movement of the shift sleeve in concert with shift fork assembly 10A. Lug segment 44 has a cylindrical aperture 46 sized to receive post 38 of first shaft member 32. Fork 14A is mounted on post 38 such that a face surface of lug segment 44 abuts flange 36 of first shaft member 32. Upon assembly, second shaft member 34 receives post 38 and its end surface abuts the opposite face surface of lug segment 44. In this manner, fork 14A is mounted between first shaft member 32 and second shaft member 34. Brazing material, or other suitable bonding medium, is inserted into channels 42 for securing post 38 within aperture 40. Fork 14A may be welded to flange 36 and second shaft member 34, if required for structural rigidity.

Figure 7:
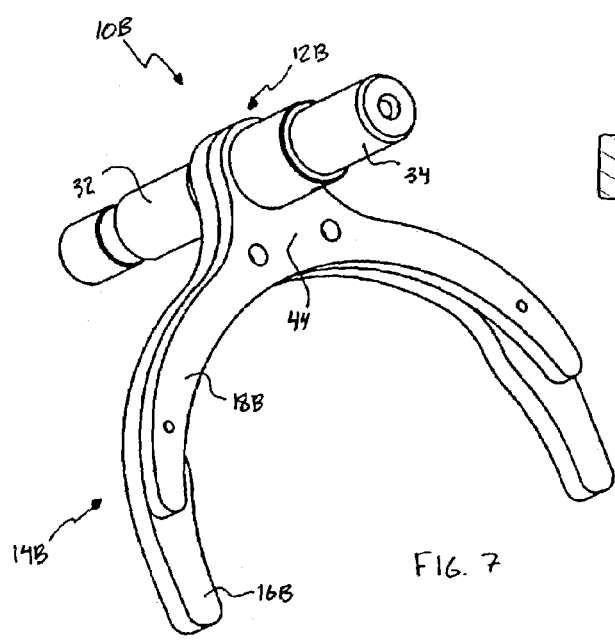
FIG. 7 is a perspective view of a laminated shift fork assembly according to a third embodiment of the present invention.
Figure 8:
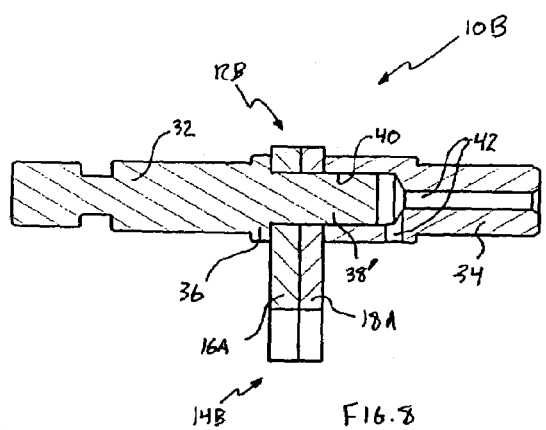
FIG. 8 is a sectional side view of the laminated shift fork assembly shown in FIG. 7.
Figure 9:
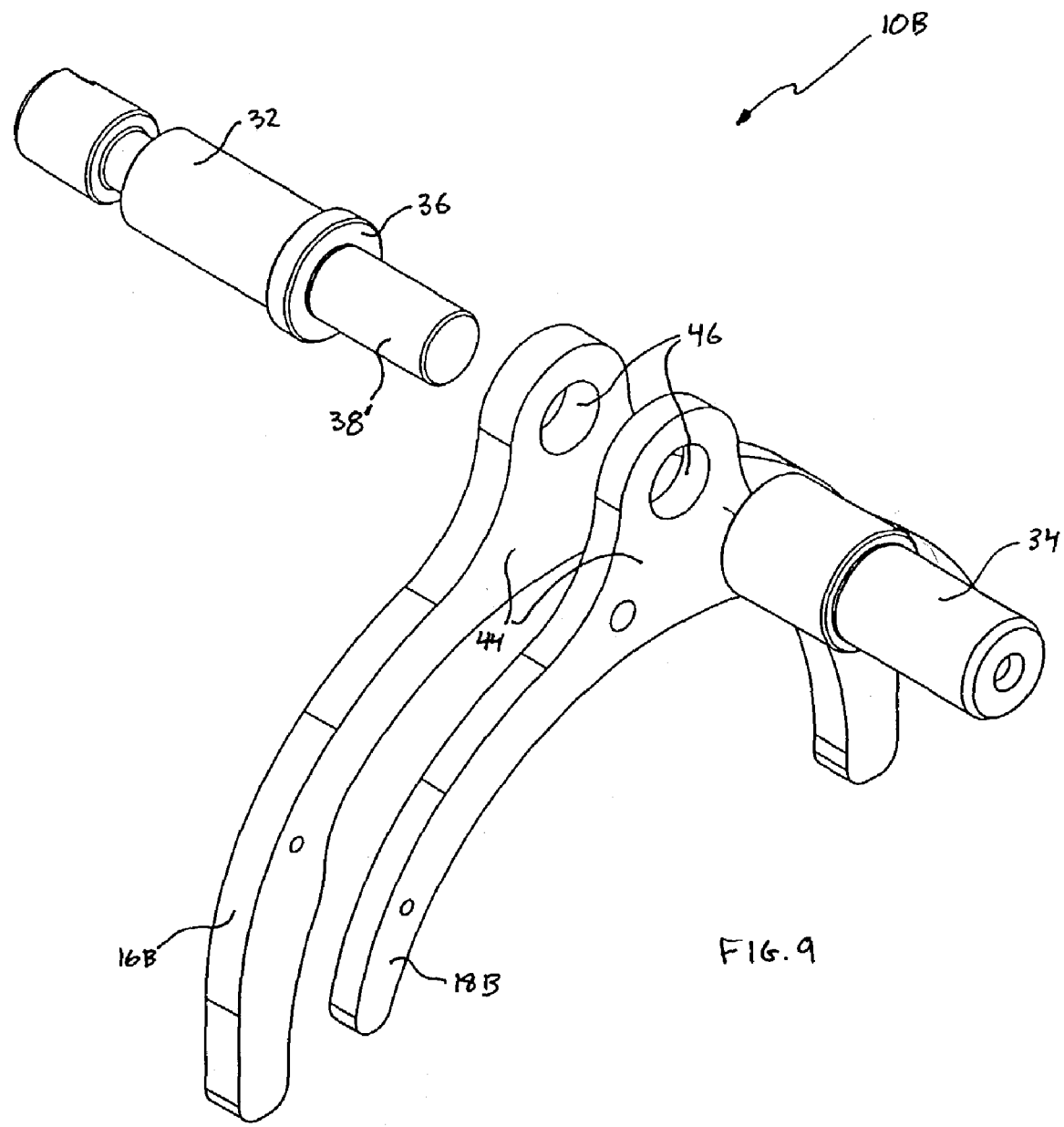
FIG. 9 is an exploded perspective view of the laminated shift fork assembly shown in FIGS. 7 and 8.

Referring now to FIGS. 7 through 9, a shift fork assembly 10B according to a third embodiment of the present invention is shown. Shift fork assembly 10B is substantially similar to shift fork assembly 10A shown in FIGS. 5 and 6. However, fork 14B is a laminated assembly having a backing plate 18B located adjacent to range yoke 16B, both of which are mounted on an extended post 38' and secured between first shaft member 32 and second shaft member 34. As seen best in FIG. 9, backing plate 18B includes a lug segment 45 having an aperture 47 which is alignable with aperture 46 in lug 44 of range yoke 16B. A suitable welding or brazing material is again introduced into channels 42 to establish a rigid connection.

Figure 10:
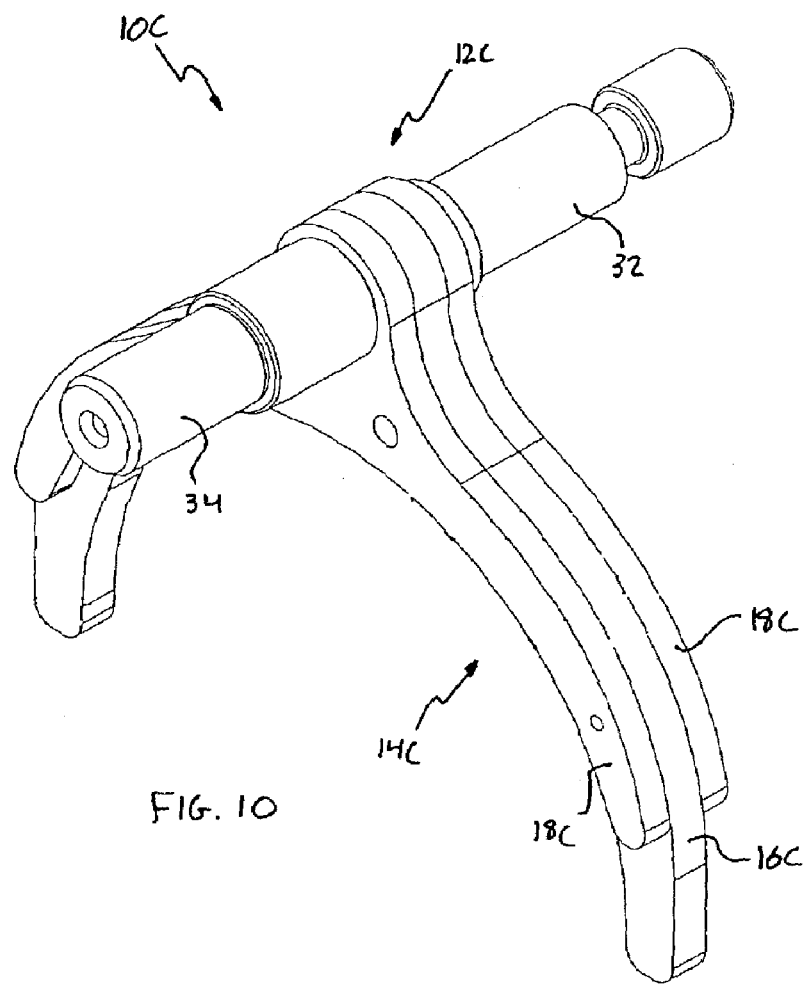
FIG. 10 is a perspective view of a laminated shift fork assembly according to a fourth embodiment of the present invention.
Figure 11:
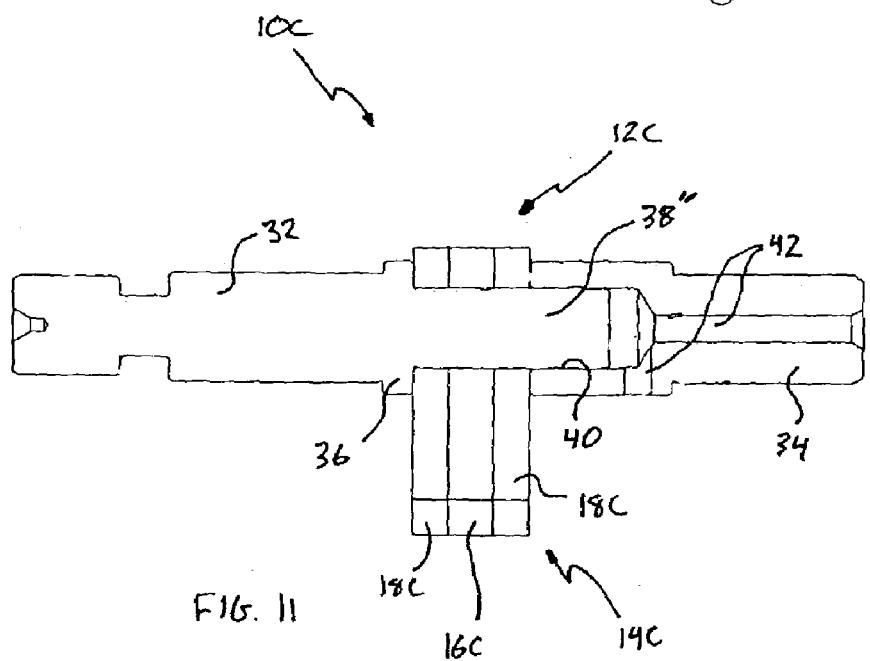
FIG. 11 is a sectional view of the laminated shift fork assembly shown in FIG. 10.

Referring now to FIGS. 10 and 11, a shift fork assembly 10C according to a fourth embodiment of the present invention is provided. Shift fork assembly 10C is substantially similar to shift fork assembly 10B shown in FIGS. 7 through 9. However, laminated fork 14C includes a pair of backing plates 18C mounted on an extended post 38" on opposite sides of range yoke 16C. As before, laminated fork 14C is secured between first shaft member 32 and second shaft member 34.

Figure 12:
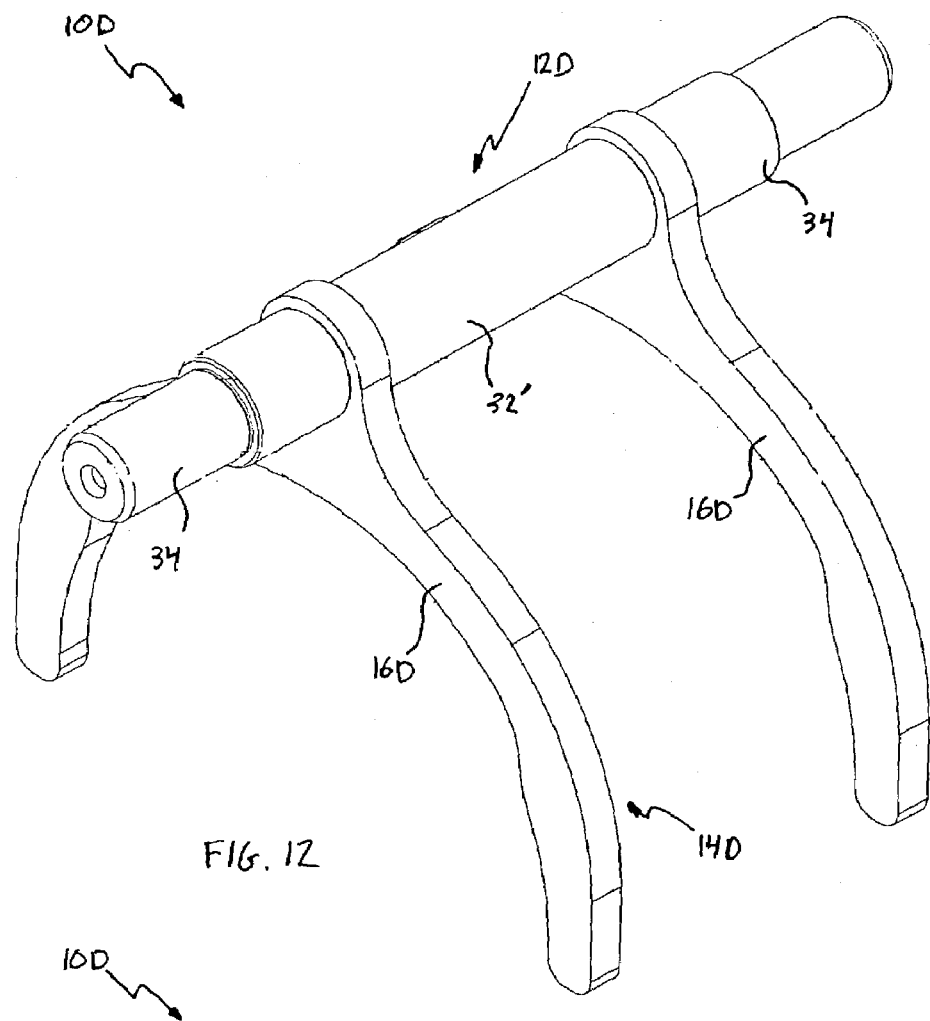
FIG. 12 is a perspective view of a laminated shift fork assembly according to a fifth embodiment of the present invention.
Figure 13:
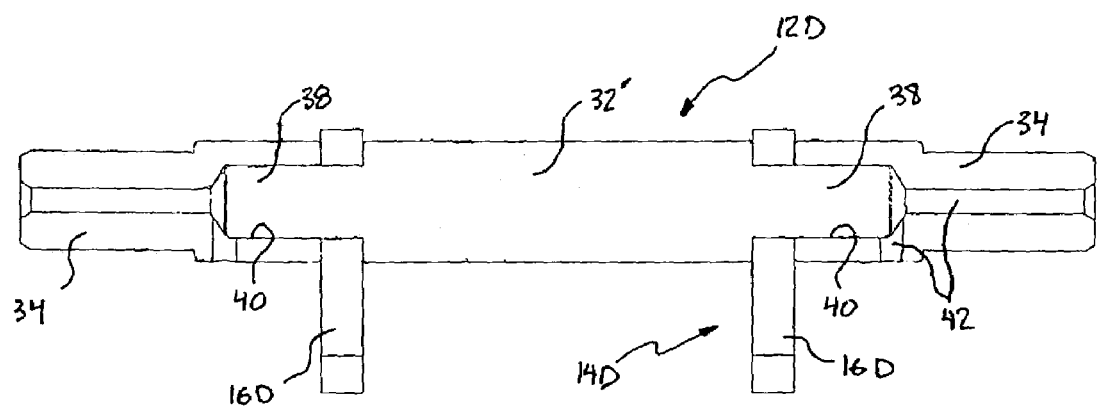
FIG. 13 is a sectional view of the laminated shift fork assembly shown in FIG. 12.

Referring now to FIGS. 12 and 13, a shift fork assembly 10D according to a fifth embodiment of the present invention is provided. Shift fork assembly 10D is generally similar to a pair of shift fork assemblies 10A shown in FIGS. 5 and 6 integrated into a common assembly. Shaft 12D includes a modified first member 32' having a pair of posts 38 at each end for receiving a pair of second shaft members 34. A pair of range yokes 16D are mounted on the pair of posts 38 between the first shaft member 32' and the pair of second shaft members 34.

Figure 14:
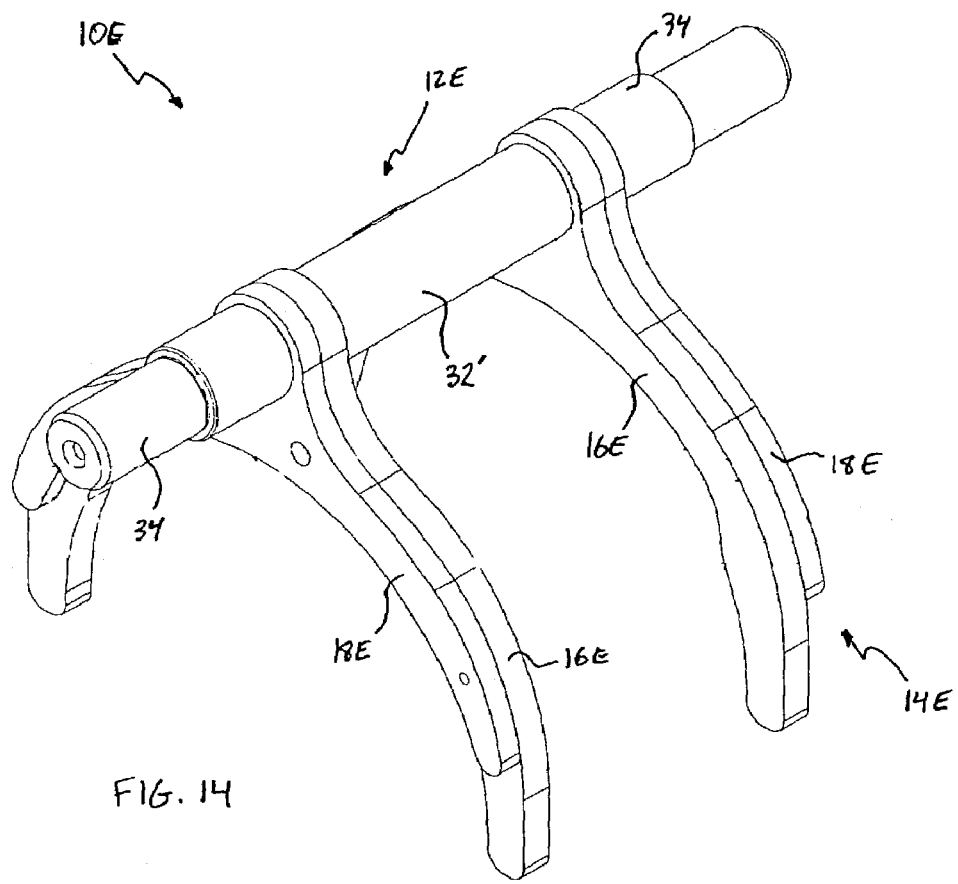
FIG. 14 is a perspective view of a laminated shift fork assembly according to a sixth embodiment of the present invention.
Figure 15:
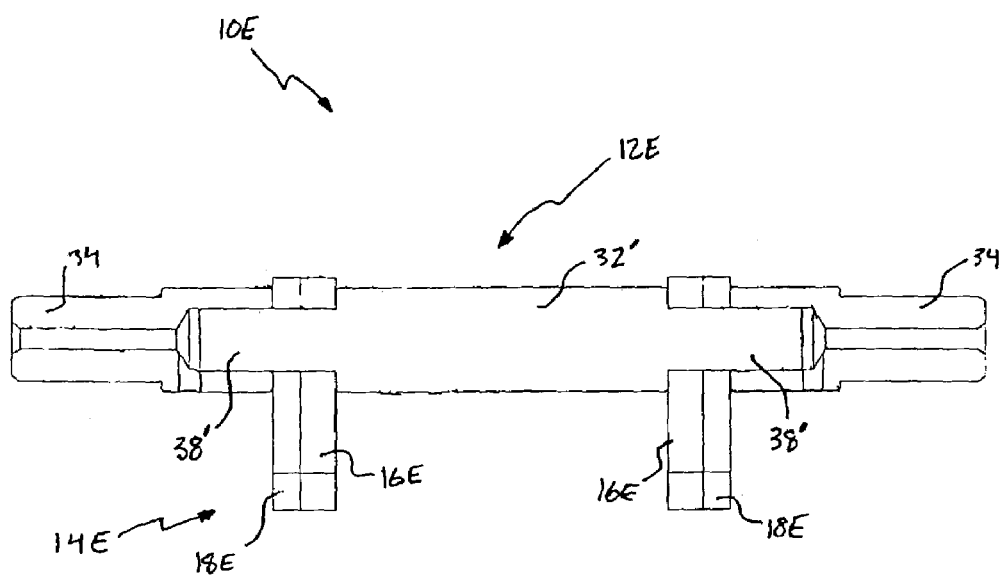
FIG. 15 is a sectional view of the laminated shift fork assembly shown in FIG. 14.

Referring now to FIGS. 14 and 15, a shift fork assembly 10E according to a sixth embodiment of the present invention is shown. Shift fork assembly 10E is substantially similar to shift fork assembly 10D shown in FIGS. 12 and 13 except that each laminated fork 14E includes a backing plate 18E that is mounted adjacent to range yoke 16E on extended posts 38'. As seen, backing plates 18E abut range yokes 16E and are secured between first shaft member 32' and the pair of second shaft members 34.

Figure 16:
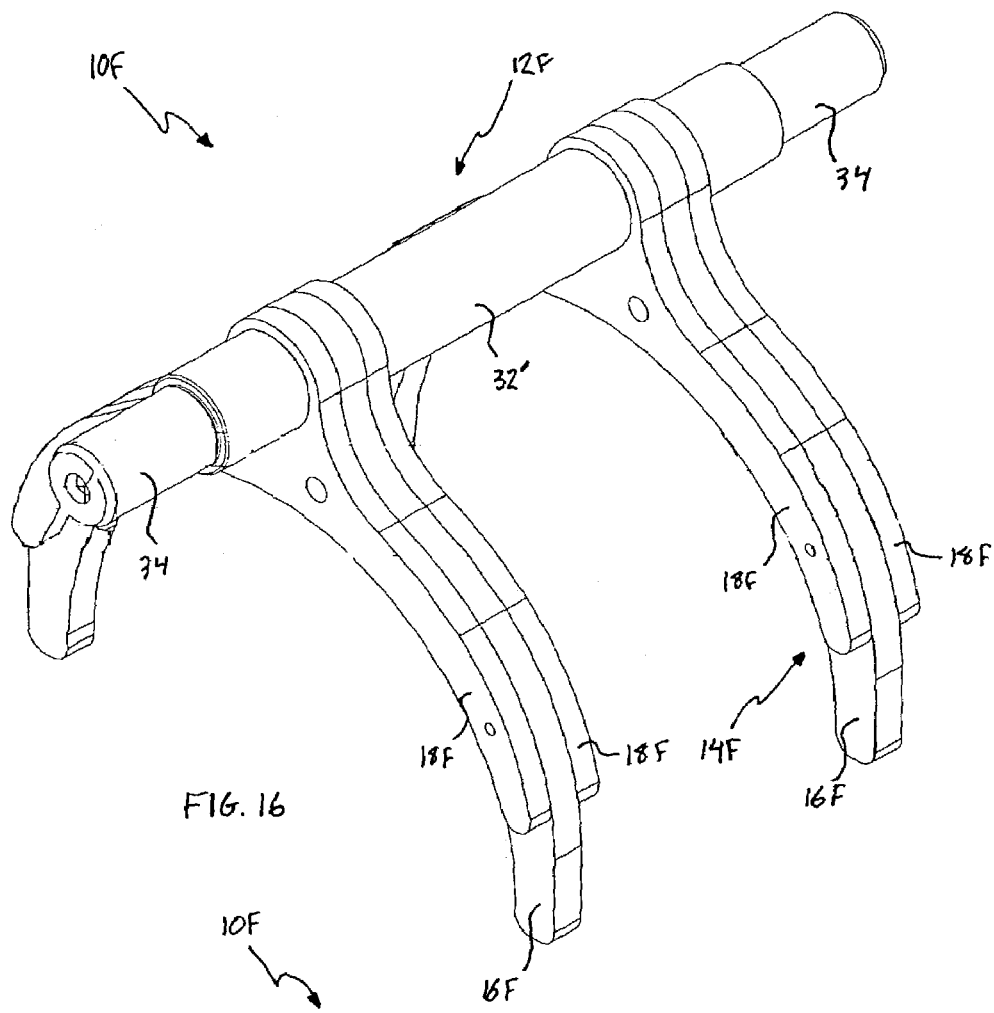
FIG. 16 is a perspective view of a laminated shift fork assembly according to a seventh embodiment of the present invention.
Figure 17:
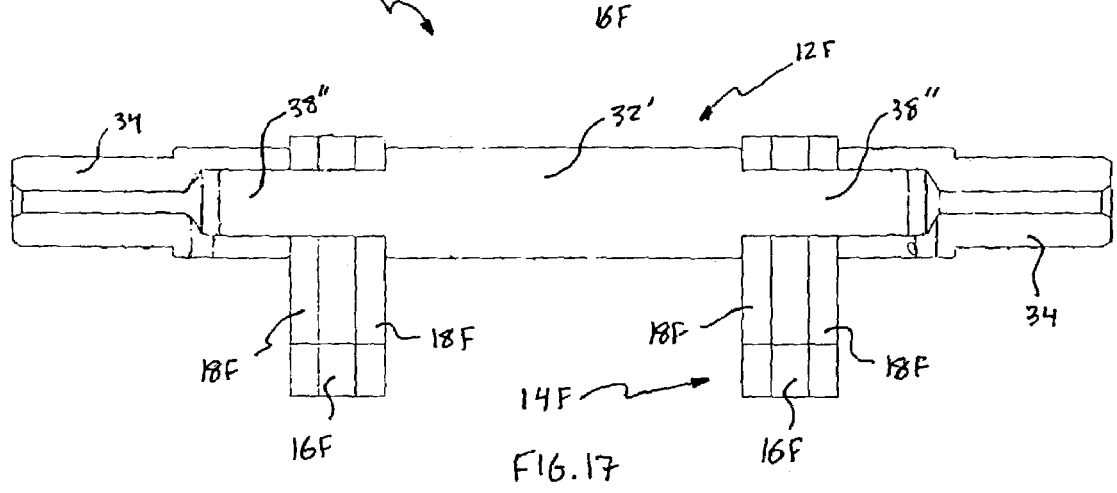
FIG. 17 is a sectional view of the laminated shift fork assembly shown in FIG. 16.

Referring now to FIGS. 16 and 17, a shift fork assembly 10F according to a seventh embodiment of the present invention is shown. Shift fork assembly 10F is substantially similar to shift fork assembly 10E shown in FIGS. 14 and 15 except that each laminated fork 14F includes a pair of backing plates 18F and a range yoke 16F that are mounted on an extended post 38". Each pair of backing plates 18F abut opposite sides of a range yoke 16F. Thereafter, laminated forks 14F are secured between first shaft member 32' and the pair of second shaft members 34.

Figure 18:
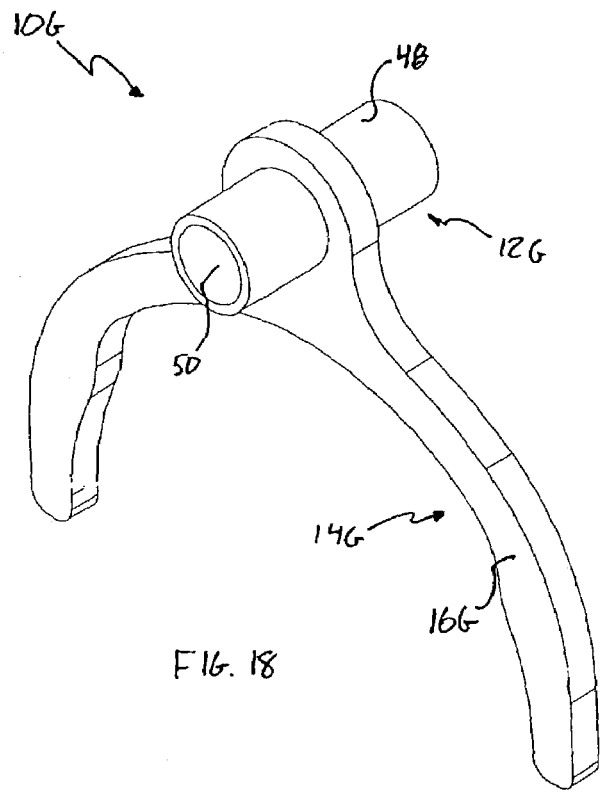
FIG. 18 is a perspective view of a laminated shift fork assembly according to an eighth embodiment of the present invention.
Figure 19:
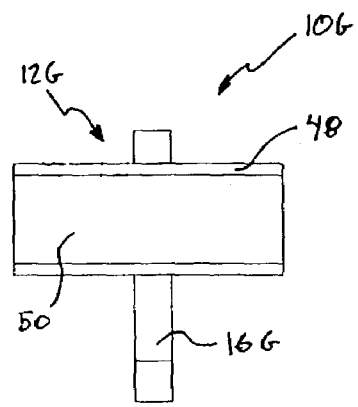
FIG. 19 is a sectional view of the laminated shift fork assembly shown in FIG. 18.

Referring now to FIGS. 18 and 19, a shift fork assembly 10G according to an eighth embodiment of the present invention is shown. Shift fork assembly 10G is substantially similar to shift fork assembly 10A shown in FIGS. 5 and 6 except that shaft assembly 12G is now a tubular member 48. Lug 44 on range yoke 16G is mounted on tubular member 48 through aperture 46 and secured via a continuous weld at the interface. The outer diameter of tubular shaft 12G is sized to provide a relative tight fit with respect to aperture 46. Shaft 12G includes an elongated cylindrical bore 50.

Figure 20:
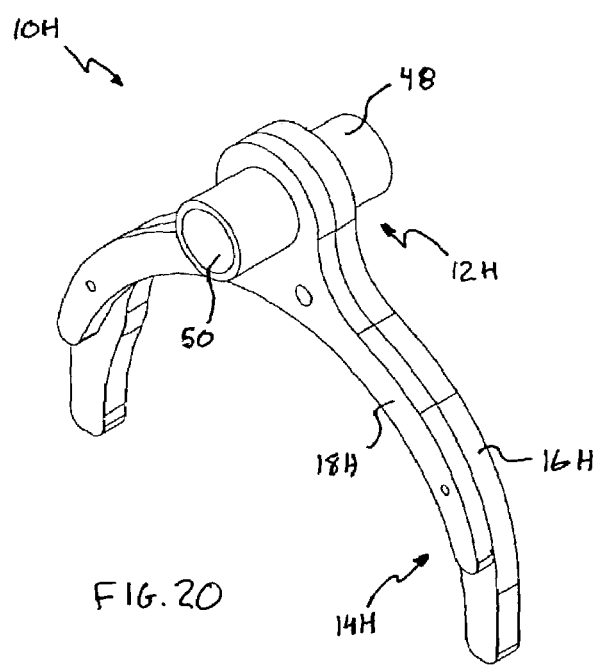
FIG. 20 is a perspective view of a laminated shift fork assembly according to a ninth embodiment of the present invention.
Figure 21:
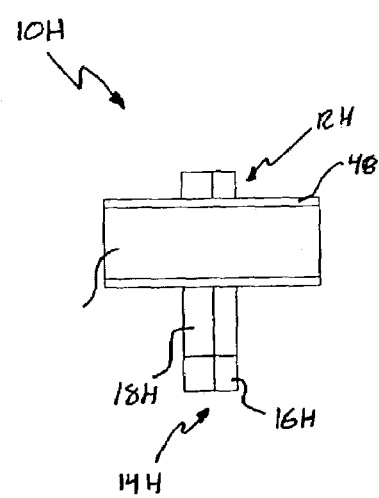
FIG. 21 is a sectional view of the laminated shift fork assembly shown in FIG. 20.

Referring now to FIGS. 20 and 21, a shift fork assembly 10H according to a ninth embodiment of the present invention is shown. Shift fork assembly 10H is substantially similar to shift fork assembly 10G shown in FIGS. 18 and 19 except that laminated fork 14H now includes a backing plate 18H mounted on tubular member 48 in abutting engagement with range yoke 16H. The components of laminated fork 14H are preferably secured to each other and shaft 12H via a continuous weld and/or braze joint at each interface.

Figure 22:
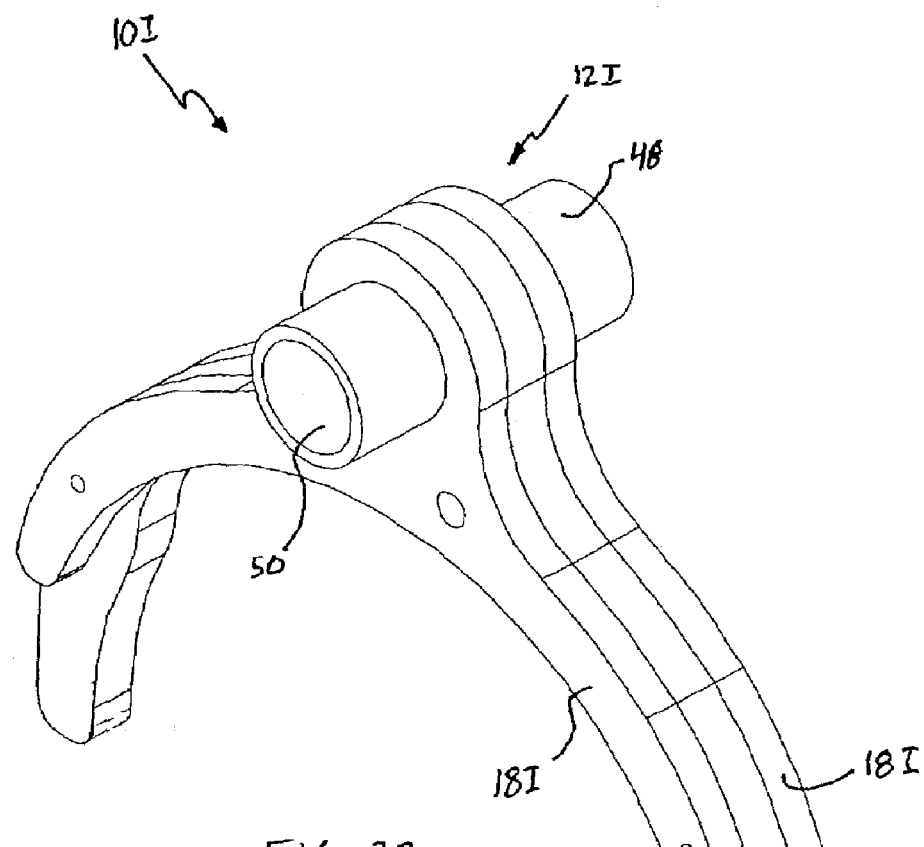
FIG. 22 is a perspective view of a laminated shift fork assembly according to a tenth embodiment of the present invention.
Figure 23:
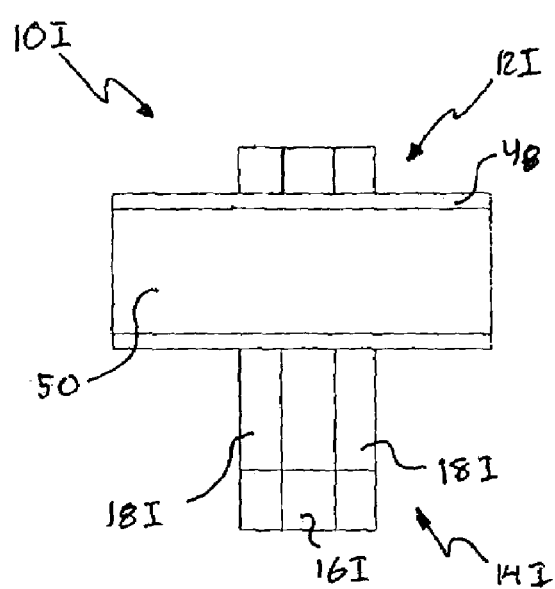
FIG. 23 is a sectional view of the laminated shift fork assembly shown in FIG. 22.

Referring now to FIGS. 22 and 23, a shift fork assembly 10I according to a tenth embodiment of the present invention is provided. Shift fork assembly 10I is substantially similar to shift fork assembly 10H shown in FIGS. 20 and 21 except that laminated fork 14I includes a pair of backing plates 18I mounted on opposite sides of range yoke 16I. Laminated fork 14I is secured via continuous welds at its interface.

Figure 24:
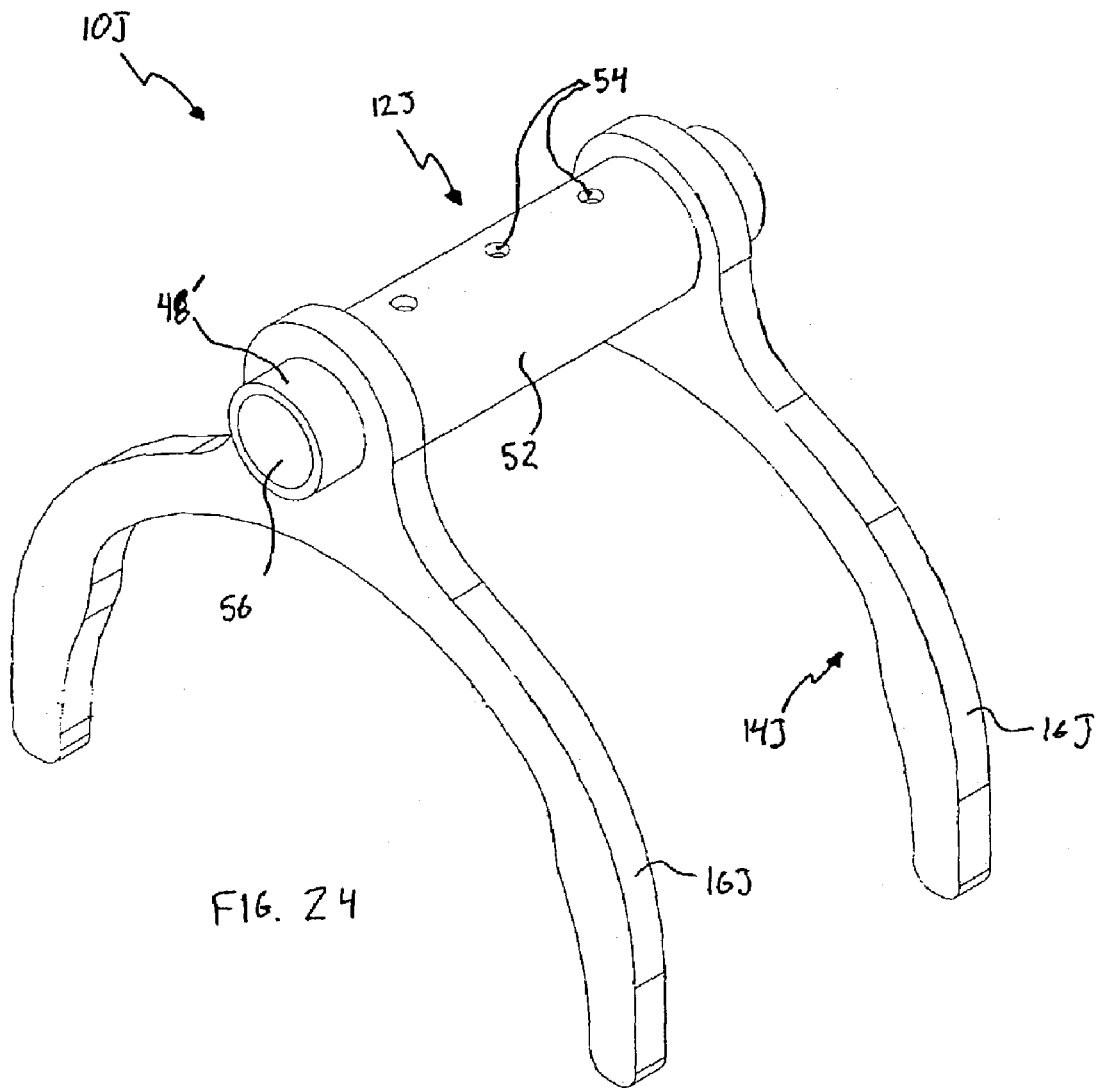
FIG. 24 is a perspective view of a laminated shift fork assembly according to an eleventh embodiment of the present invention.
Figure 25:
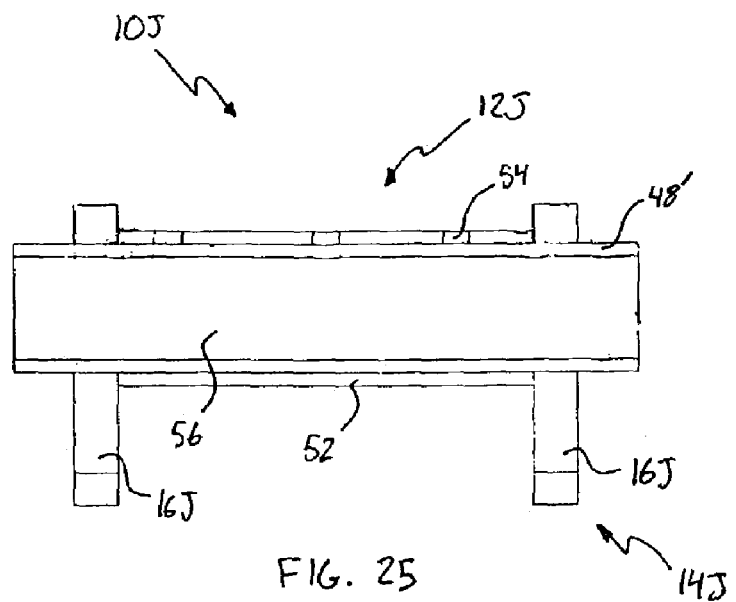
FIG. 25 is a sectional view of the laminated shift fork assembly shown in FIG. 24.

Referring now to FIGS. 24 and 25, a shift fork assembly 10J according to an eleventh embodiment of the present invention is provided. Shift fork assembly 10J is substantially similar to a pair of shift fork assemblies 10G integrated into a common assembly. In particular, shaft assembly 12J is a modified tubular member 48' having an extended length. Fork assembly 10J further includes a tubular locator sleeve 52 mounted over tubular shaft member 48' and arranged to locate a pair of range yokes 14J thereon. Locator sleeve 52 has a plurality of holes 54 and a length less than tubular member 48'. Locator sleeve 52 defines a cavity 56 sized to receive tubular member 48'. Tubular member 48' is mounted within cavity 56 of locator sleeve 52 and secured via brazing material inserted into the plurality of holes 54. A pair of range yokes 16J are mounted on tubular member 48' and each has an inner face surface of its lug 44 in abutting engagement with an end of locator sleeve 52. The pair of range yokes 16J are secured to tubular member 48' via continuous welds at their interface.

Figure 26:
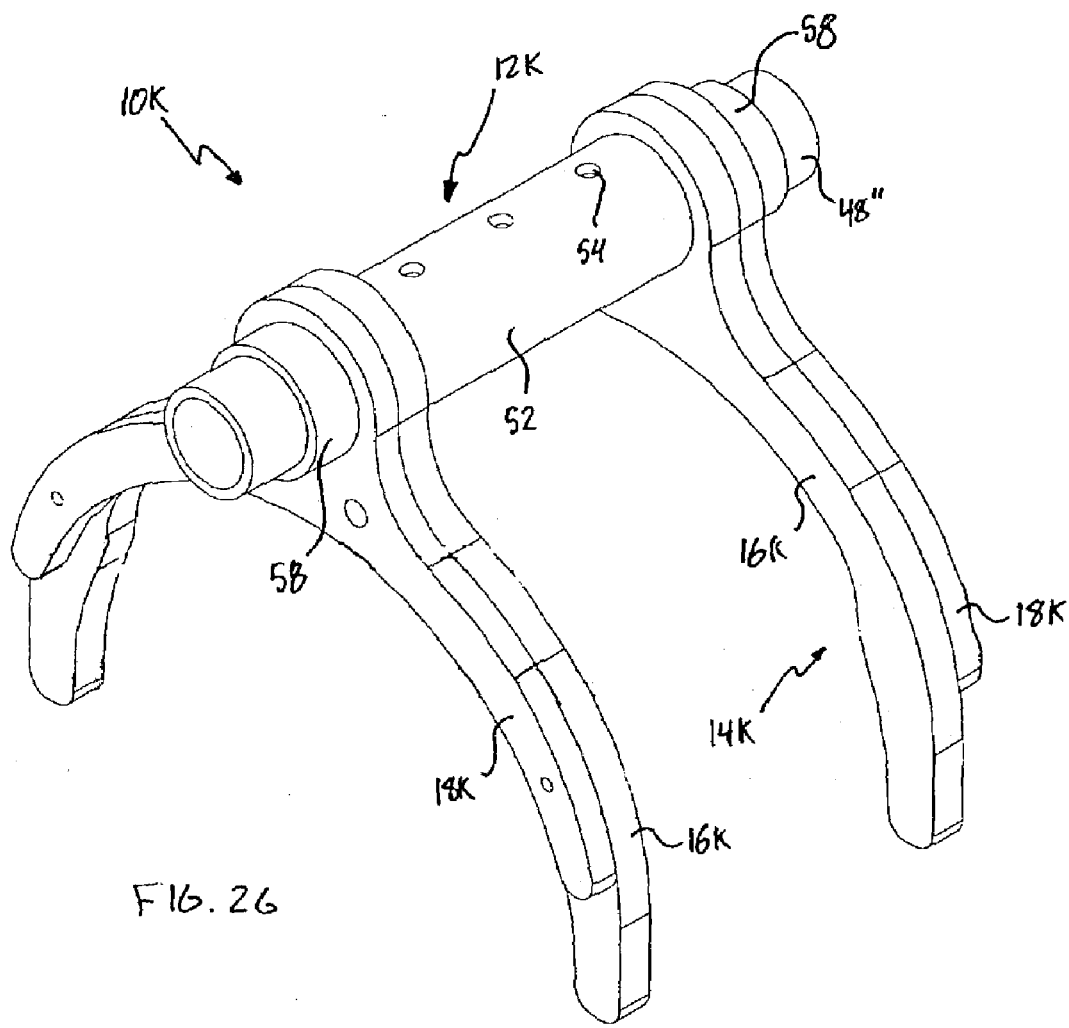
FIG. 26 is a perspective view of a laminated shift fork assembly according to a twelfth embodiment of the present invention.
Figure 27:
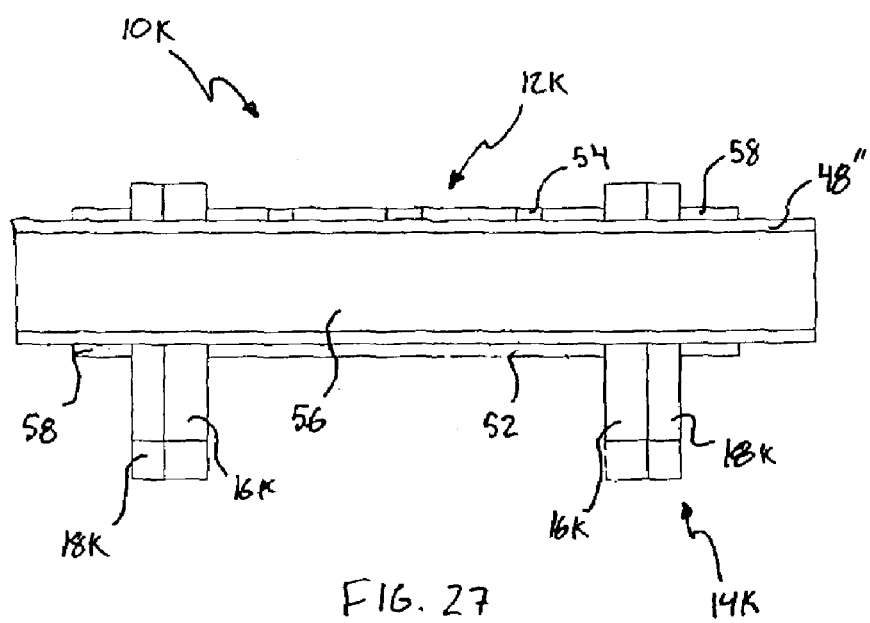
FIG. 27 is a sectional view of the laminated shift fork assembly shown in FIG. 26.

Referring now to FIGS. 26 and 27, a shift fork assembly 10K according to a twelfth embodiment of the present invention is provided. Shift fork assembly 10K is substantially similar to shift fork assembly 10J shown in FIGS. 24 and 25. However, shaft assembly 12K has a modified tubular member 48" having an extended length to accommodate for mounting laminated forks 14K thereon. Also, laminated forks 14K each include a backing plate 18K mounted on tubular member 48" and abutting range yokes 16K. An end cap 58 is mounted on each end of tubular member 48" and abuts corresponding backing plate 18K. End caps 58 are secured via continuous welds at their interfaces.

Figure 28:
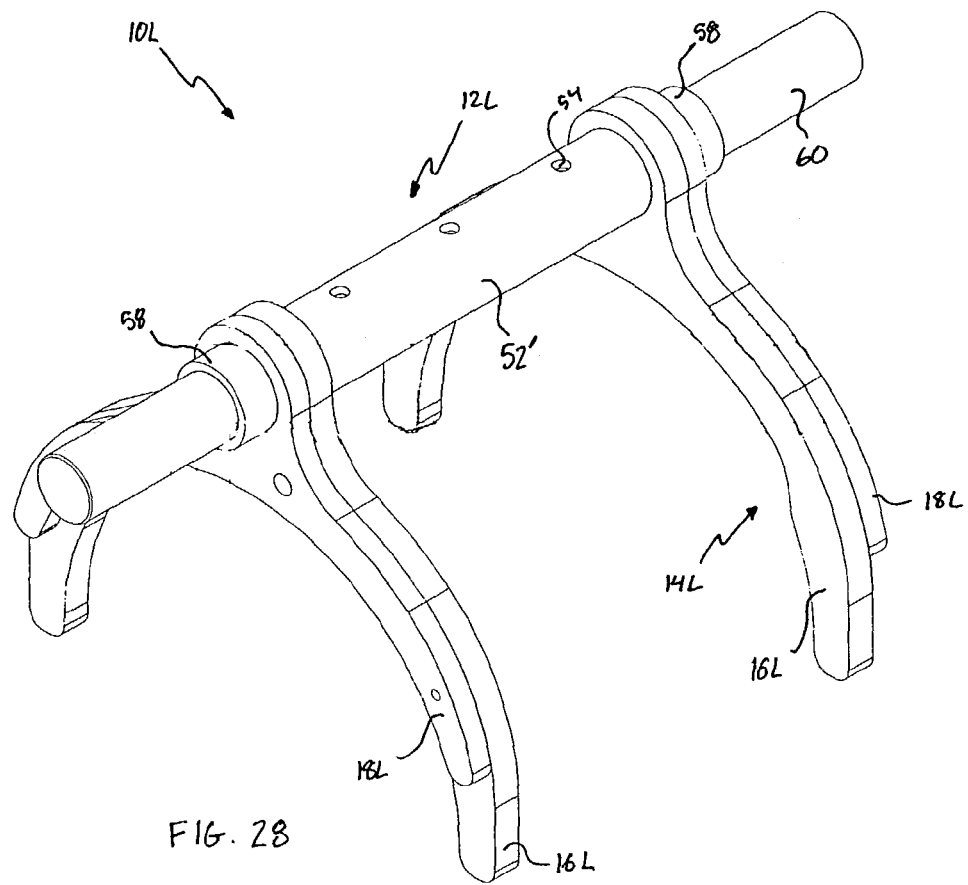
FIG. 28 is a perspective view of a laminated shift fork assembly according to a thirteenth embodiment of the present invention.
Figure 29:
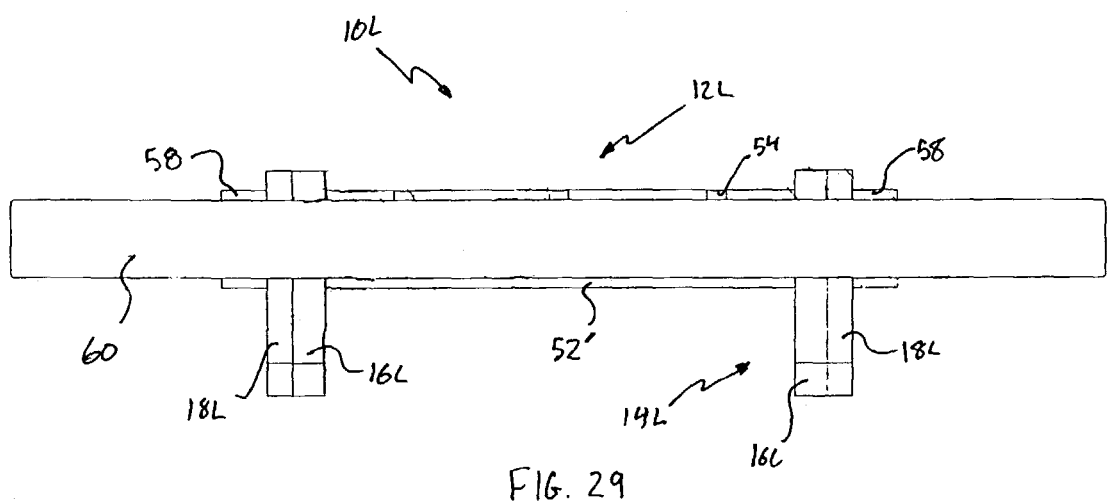
FIG. 29 is a sectional view of the laminated shift fork assembly shown in FIG. 28.

Referring now to FIGS. 28 and 29, a shift fork assembly 10L according to a thirteenth embodiment of the present invention is provided. Shift fork assembly 10L is substantially similar to shift fork assembly 10K shown in FIGS. 26 and 27 except that tubular member 48" is now replaced with a solid shaft 60.

Figure 30:
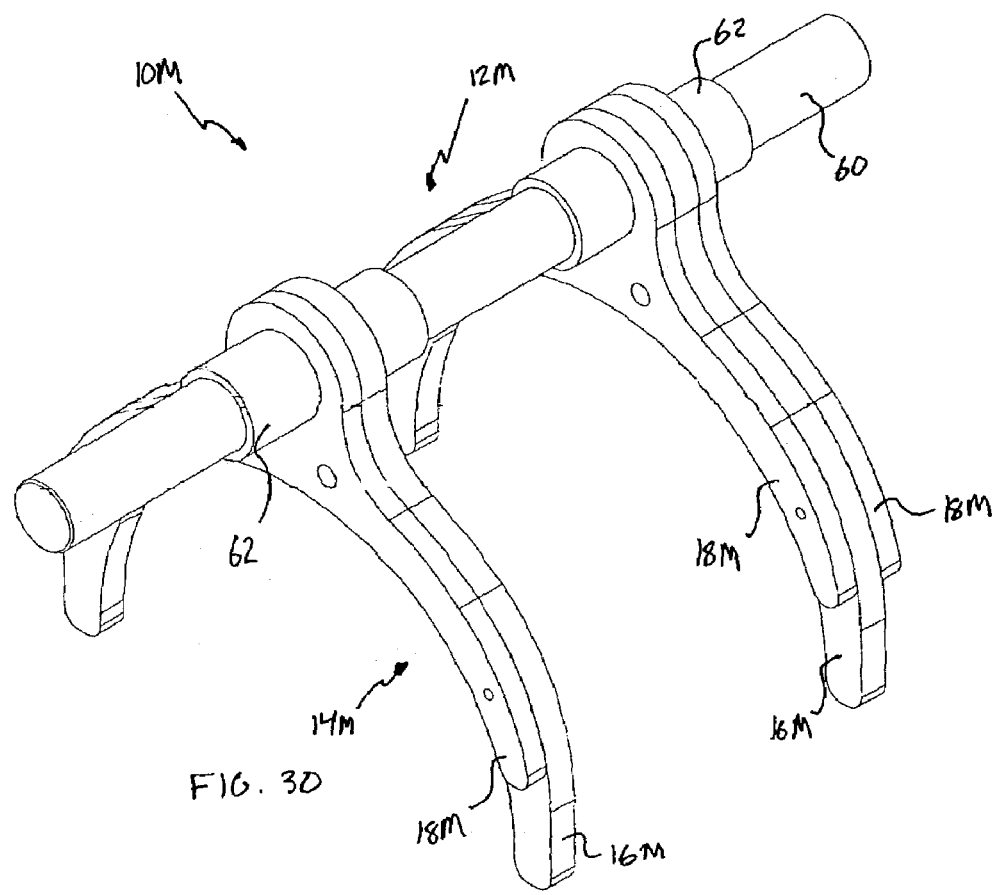
FIG. 30 is a perspective view of a laminated shift fork assembly according to a fourteenth embodiment of the present invention.
Figure 31:
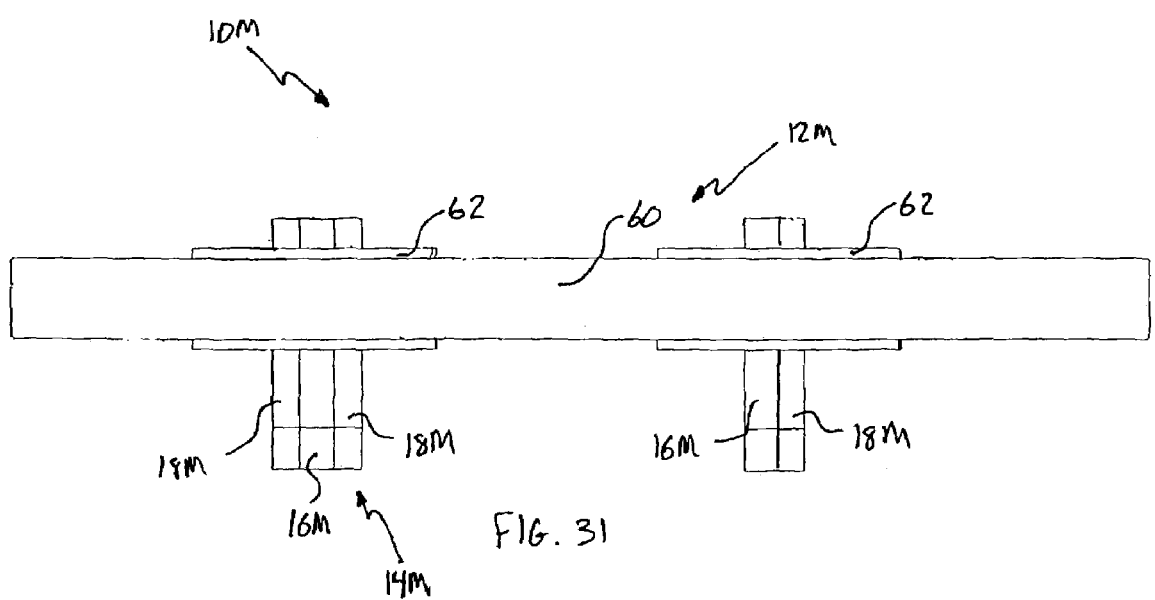
FIG. 31 is a sectional view of the laminated shift fork assembly shown in FIG. 30.

Referring now to FIGS. 30 and 31, a shift fork assembly 10M according to a fourteenth embodiment of the present invention is provided. Shift fork assembly 10M is generally similar to shift fork assembly 10L shown in FIGS. 28 and 29. However, shaft 12M does not include a locator sleeve 62 but rather a pair of tubular bosses 62 mounted on solid shaft 60. A first laminate fork 14M having a range yoke 16M and a backing plate 18M is mounted on one tubular boss 62 while a second laminate fork 14N having range yoke 16N between a pair of backing plates 18N are mounted on the other tubular boss 62. Tubular bosses 62, range yokes 16M, and backing plates 18M are all secured via continuous welds at their interfaces.

The various preferred embodiments have been disclosed to provide those skilled in the art an understanding of the best mode currently contemplated for the operation and construction of the present invention. The invention being thus described, it will be obvious that various modifications can be made without departing from the true spirit and scope of the invention, and all such modifications as would be considered by those skilled in the art are intended to be included within the scope of the following claims.

What is claimed is:

1. A shift fork assembly, comprising:
    a shaft assembly including a first member having a post, and a second member defining a socket within which said post is disposed; and
    a range fork having a lug segment mounted on and engaged with said post, said lug segment being disposed between said first member and said second member, wherein said first member includes a body segment from which said post extends and a radial flange formed adjacent said post, wherein said range fork includes an aperture through which said post extends such that a first face surface of said range fork engages said radial flange, wherein a second face surface of said range fork engages an end of said second shaft member, wherein said first shaft member, said second shaft member, and said range fork are rigidly connected by a weld joint, and further wherein said second shaft member includes a radial channel and an axial channel that communicate with said socket for receiving a welding material to secure said post within said socket.

2. A shift fork assembly, comprising:
a shaft assembly including a first member having a post, and a second member defining a socket within which said post is disposed; and
a range fork having a lug segment mounted on and engaged with said post, said lug segment being disposed between said first member and said second member, wherein said range fork is a yoke member having a pair of spaced end segments extending from said lug segment, and further wherein said range fork further includes a backing plate mounted on said post and located adjacent to said yoke member.

3. The shift fork assembly of claim 2 wherein said range fork further includes a second backing plate mounted on said post and located on an opposite side adjacent to said yoke member.

4. A shift fork assembly, comprising:
a shaft assembly including a first member having a body segment from which a post extends and a radial flange formed adjacent said post, the shaft assembly further including a second member defining a socket within which said post is positioned; and
a range fork having a lug segment mounted on said post and positioned between said first member and said second member.

5. The shift fork assembly of claim 4 wherein said range fork includes an aperture through which said post extends such that a first face surface of said range fork engages said radial flange.

6. The shift fork assembly of claim 5 wherein a second face surface of said range fork engages an end of said second member.

7. The shift fork assembly of claim 6 wherein said first member, said second member, and said range fork are rigidly connected.

8. A shift fork assembly, comprising:
a shaft assembly including a first member having a post, and a second member defining a socket within which said post is positioned;
a range fork engaging said post; and
a first backing plate positioned on a first side of said range fork and a second backing plate positioned on a second opposite side of said range fork, wherein a portion of said first backing plate, a portion of said range fork and a portion of said second backing plate are captured between a portion of said first member and a portion of said second member.

9. The shift fork assembly of claim 8 wherein said first backing plate, said range fork and said second backing plate are restricted from axial movement relative to said post.

10. The shift fork assembly of claim 9 wherein said first member is fixed to said second member.

11. The shift fork assembly of claim 8 wherein each of said first and second backing plates includes an aperture extending therethrough in receipt of said post.

12. The shift fork assembly of claim 8 wherein said first member is in engagement with each of said first backing plate, said second backing plate and said shift fork, said second member engaging said second backing plate.

* * * * *